May 10, 1932. W. G. LAIRD 1,858,158
GAS AND LIQUID CONTACT APPARATUS
Filed Oct. 6, 1927
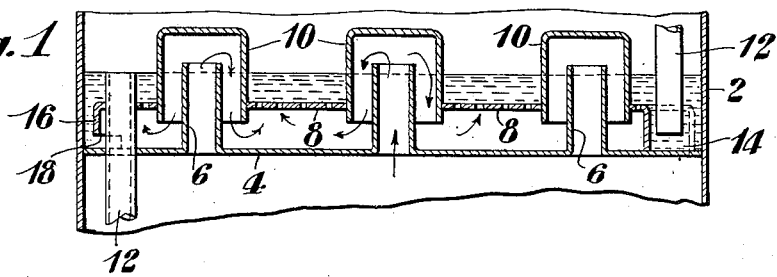
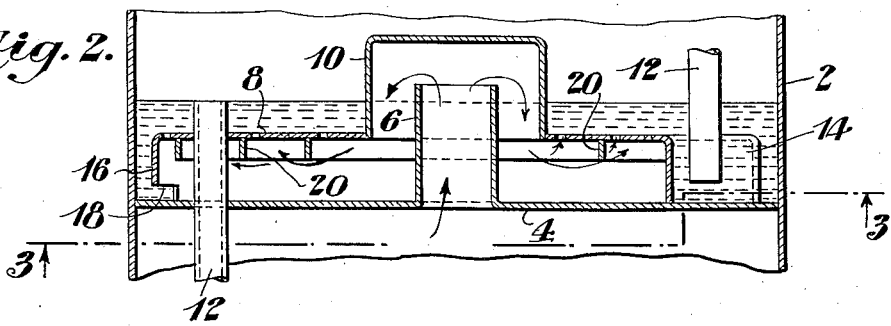
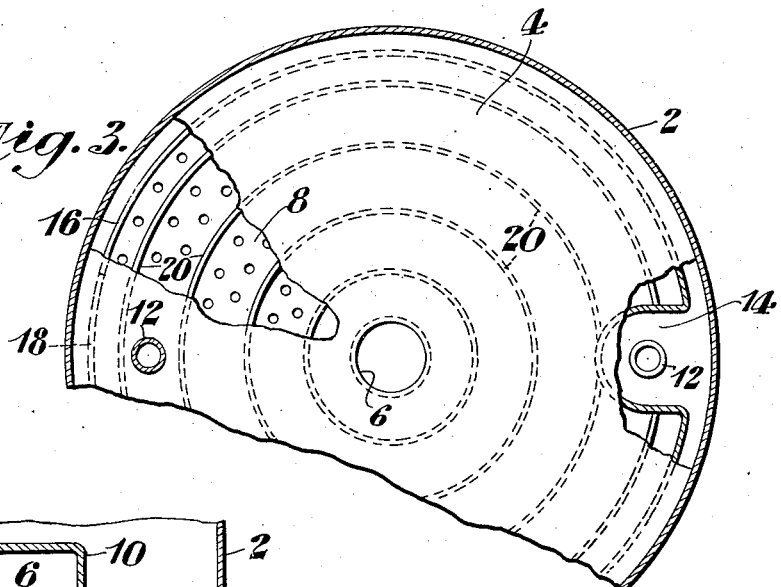
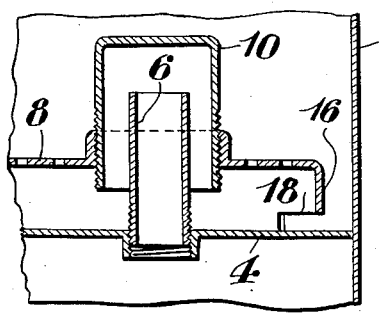
Inventor
WILBUR G. LAIRD
By his Attorney
Edmund G. Borden Patented May 10, 1932

1,858,158

UNITED STATES PATENT OFFICE

WILBUR G. LAIRD, OF NEW YORK, N. Y., ASSIGNOR TO HEAT TREATING COMPANY, OF NEW YORK, N. Y., A CORPORATION OF DELAWARE

GAS AND LIQUID CONTACT APPARATUS

Application filed October 6, 1927. Serial No. 224,350.

This invention relates to improvements in bubble towers or other types of apparatus for intimately contacting a gas or vapor with a liquid.

The invention is particularly adapted for use in rectifying towers used for treating petroleum vapors, but may be applied in any art where it is desired to bring a gas or vapor into intimate contact with a liquid, either for chemical reaction, distillation, saturation or for other purposes.

The present invention has particularly to do with the type of bubbling plates in which bubble caps deliver the gas or vapor beneath a perforated plate which is spaced from and above the bubble tray proper. In structures of this type now in use it has been found that under normal operating conditions the velocity of the gas as it passes from the lower edge of the bubble cap under the perforated plate is so high that practically no gas passes through the perforations near the cap and in some cases the gas in passing at a high velocity across the perforations near the caps actually draws liquid down instead of distributing gas therethrough.

The present invention, therefore, as one of its chief objects, aims to overcome this defect and provide a simple bubbler plate structure which will give a uniform distribution over the whole surface of the perforated plate.

Other objects and advantages of the invention will be apparent from the following detailed description taken with the accompanying drawings, in which:

Fig. 1 is a vertical sectional view of a broken portion of a bubbler plate tower showing a single bubbler plate in which the invention is illustrated;

Fig. 2 is a vertical sectional view of a broken portion of a bubbler plate tower illustrating a slightly modified embodiment of the invention;

Fig. 3 is a horizontal sectional view of the apparatus shown in Fig. 2, looking upward on the line 3—3. Parts in this figure are broken away to show the structure of parts above;

Fig. 4 is an enlarged detail view of the bubble cap structure shown diagrammatically in Fig. 1.

In all figures of the drawings like reference characters refer to the same or corresponding parts of the apparatus.

Fig. 1 of the drawings shows a portion of a bubbler plate tower or contact apparatus 2, including one of a plurality of bubbler trays. Each tray comprises a horizontal partition 4 fixed to the wall or walls of the tower 2. The partition 4 is provided with a plurality of openings uniformly placed over the area of the partition, these openings being fitted with vapor chimneys 6 which extend to a considerable height above the partition. Resting on the partition 4 and spaced therefrom is a perforated plate 8, in which is mounted a plurality of bubble caps 10 corresponding in position and number to the vapor chimneys 6. In the structure as shown the lower edge of the bubble caps extends through the perforated plate to a point below the lower surface thereof so as to form a baffle. A body of liquid is maintained on each tray by an overflow pipe 12 (shown at the left in Fig. 1), which also delivers excess liquid to the next tray below. (The delivery end of such a pipe is shown at the right in Fig. 1.) The discharge end of the overflow pipes 12 delivers the overflow liquid from the tray above into a pocket 14 formed in the perforated plate 8 so that the liquid is not delivered directly under this plate. Fig. 3 shows a plan view of a similar pocket.

The perforated plates 8 are usually made with the edge turned down as at 16 so as to form a support for uniformly spacing the plate from the tray or partition 4. A port 18 is cut in the supporting part 16 on one side of each plate to give a convenient escape for liquid which may otherwise be trapped under the plate 8, for example when starting up the apparatus. Only one port 18 is cut in each plate so that any liquid which may enter by this port must leave through the same opening and not be permitted to cross the plate 4 to or from the overflow without being subjected to rectification.

In operating a column equipped with bubbler plates and caps of the kind shown in Fig. 1 vapor or gas passes through the vapor chimneys 6, under the caps 10, then under the plate 8 and finally through the perforations therein and the liquid on the tray. In this operation the lower edge of the bubbler caps which extends below the plate 8 serves to decrease the velocity of the gas along the under surface of the plate 8, and thereby gives a very uniform distribution of the gas over the whole plate area.

In certain types of gas and liquid contact apparatus it is desirable to have a rather high gas velocity and because of this a certain fixed projection of the caps 10 below the plate 8 may not give proper distribution under all conditions. The detailed construction in Fig. 4 shows means provided for adjusting the extent of projection of the caps 10. This means consists of a threaded connection between the plate 8 and the cap 10 so that the cap may be inserted as far as desired or completely removed. The caps 10 may be completely removed for the purpose of repairs or replacement, for example, the removal and replacement of the vapor chimneys 6 which screw into the tray or partition 4. This structure besides having the advantages of adjustability and removal of parts for purposes of repair and replacement, also permits the replacement or repair of the particular part affected without involving the removal of the whole plate or bubble cap structure.

The modified form of the invention illustrated in Figs. 2 and 3 is a bubble tray construction comprising a single bubble cap 10, attached centrally of a perforated plate 8. In this construction the distributing baffle or deflector projection for altering the velocity of the gas along the under side of the perforated plate 8, comprises a plurality of projecting annular baffles 20 attached at spaced intervals along the under side of the plate 8. These baffles are preferably placed concentric with the bubble cap. It is to be understood that the structure comprising a single bubble cap is shown merely for simplicity of illustration, and that baffles of the type shown in Figs. 2 and 3 may be used where several bubble caps are employed as in Fig. 1.

When a column equipped with baffles 20 as shown in Figs. 2 and 3 is used for distillation, rectification or contact reactions, the gas or vapor passes around the lower edge of the cap 10 at a considerable velocity but due to the effect of the baffles 20 the velocity of the gas near the lower surface of the plate 8 is broken so that the upward pressure of the gas in any of the perforations is not affected by lateral velocity as in ordinary constructions.

In present structures where a single central bubble cap is used it is often the practice to incline the plate 8 upwardly toward the cap, but it is the object in the present instance to maintain the plates 8 substantially horizontal so that the layer of liquid above the plates will have a uniform depth and thereby promote even distribution of bubbles over the whole surface of the liquid on each tray. It is evident that if the liquid has a greater depth on one portion of the plate than on another, the gas will tend to go through the shallow part first.

It is to be understood that the invention is not limited to a tower or bubble caps of any particuar shape or cross section or to any particular means for adjusting the baffle arrangement shown in Fig. 4.

Having described the invention in its preferred embodiment, what is claimed as new is:

1. In a bubbler plate gas and liquid contact apparatus, a bubbler tray comprising a vapor chimney extending thereabove, a perforated distributor plate above and spaced from said tray comprising an opening surrounding said chimney, a bubbler cap in said opening over said vapor chimney and an adjustable connection between said plate and said cap whereby the lower edge of said cap may be raised or lowered with respect to said plate.

2. In a bubbler plate gas and liquid contact apparatus, a bubbler tray comprising a vapor chimney to deliver vapors under a bubbler cap, a perforated distributor plate on said tray and spaced thereabove, an opening in said plate surrounding said vapor chimney, a bubbler cap in said opening and over said vapor chimney, the lower edge of said bubbler cap extending below the lower surface of said plate and an adjustable connection between said cap and said plate whereby said cap may be vertically adjusted.

3. An apparatus for contacting gases and liquids, which comprises a perforated distributor plate, means for delivering gas from a localized position with respect to said plate and for conducting it under said plate, and a baffling means vertically adjustable with respect to said plate for preventing a high velocity of said gas along the under surface of said plate.

4. In a bubbler plate column, a horizontal partition comprising an opening therein, a removable vapor chimney in said opening extending above said partition, a substantially horizontal perforated distributor plate above and spaced from said partition, an opening in said plate surrounding said chimney, a bubble cap in said last mentioned opening over said chimney and an adjustable connection between said cap and said plate whereby the lower edge of said cap may be extended below the lower surface of said plate or said cap be completely detached from said plate.

5. In a bubbler plate gas and liquid contact apparatus, a bubbler plate comprising a perforated distributor plate, means for delivering gas under said plate from a conduit, and a projecting baffle connected to said perforated plate and extending around said conduit, for decreasing the lateral velocity of said gas along the under side of said plate.

6. In a gas and liquid contact apparatus, a bubbler cap tray comprising a tray plate, a vapor passage in said plate, a vapor chimney surrounding said passage and extending above said plate, a perforated distributor plate above said tray plate, a bubbler cap set in said distributor plate over said vapor chimney whereby gas passing upwardly through said chimney is deflected under said distributor plate, spaced concentric baffles extending below the lower surface of said distributor plate to break the lateral velocity of the gas passing along under said distributor plate, and means for retaining a body of liquid on said tray sufficient to cover said distributor plate.

In testimony whereof I affix my signature.

WILBUR G. LAIRD.